(12) United States Patent
Wu et al.

(10) Patent No.: US 11,603,612 B2
(45) Date of Patent: Mar. 14, 2023

(54) GLASS FIBER MAT WITH LOW-DENSITY FIBERS

(71) Applicant: Owens Corning Intellectual Capital, LLC, Toledo, OH (US)

(72) Inventors: Jianhui Wu, Westerville, OH (US); David Hartman, Granville, OH (US); William Sorsby, Millersport, OH (US); Jeff Pessell, Newark, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 17/056,901

(22) PCT Filed: May 29, 2019

(86) PCT No.: PCT/US2019/034310
§ 371 (c)(1),
(2) Date: Nov. 19, 2020

(87) PCT Pub. No.: WO2019/231994
PCT Pub. Date: Dec. 5, 2019

(65) Prior Publication Data
US 2021/0301439 A1    Sep. 30, 2021

Related U.S. Application Data

(60) Provisional application No. 62/677,370, filed on May 29, 2018.

(51) Int. Cl.
*D04H 1/64* (2012.01)
*C08J 5/24* (2006.01)
(Continued)

(52) U.S. Cl.
CPC ............... *D04H 1/64* (2013.01); *C04B 28/14* (2013.01); *C08J 5/244* (2021.05); *C08J 5/245* (2021.05);
(Continued)

(58) Field of Classification Search
CPC .. D06N 3/0061; D06N 3/0063; D06N 7/0002; D04H 1/4209; D04H 1/4218;
(Continued)

(56) References Cited

U.S. PATENT DOCUMENTS 4,412,854 A    11/1983    Layden
4,584,040 A    4/1986    Anderson
(Continued)

FOREIGN PATENT DOCUMENTS

EP    2781652 A1    9/2014
JP    2004308038 A    11/2004
(Continued)

OTHER PUBLICATIONS

International Search Report and Written Opinion from PCT/US2019/034310 dated Aug. 14, 2019.
(Continued)

*Primary Examiner* — Camie S Thompson
(74) *Attorney, Agent, or Firm* — Calfee, Halter & Griswold LLP (57) ABSTRACT

A binder composition for use in the manufacture of a nonwoven mat including a low-density fiber, and nonwoven mats made with the binder, are disclosed. The low-density fiber is able to reduce the acoustic openness of the nonwoven mats made therefrom while also capable of being delivered with existing binder technology and equipment.

19 Claims, 6 Drawing Sheets

(51) Int. Cl.
*C04B 28/14* (2006.01)
*D04H 1/4218* (2012.01)
*D04H 1/542* (2012.01)
*C04B 111/00* (2006.01)

(52) U.S. Cl.
CPC .......... *D04H 1/4218* (2013.01); *D04H 1/542* (2013.01); *C04B 2111/0062* (2013.01)

(58) Field of Classification Search
CPC .......... D04H 1/542; D04H 1/64; D04H 1/546; C08J 5/244; C08J 5/245; C08J 28/14; C04B 2111/0062; B32B 5/022; B32B 5/08; B32B 13/14; B32B 2260/021; B32B 2260/046; B32B 2260/101; B32B 2607/00; B32B 17/02; Y10T 442/685; E04C 2/043; E04C 2/46; E04C 2/06; E04C 2/16; E04C 2/28; B27N 3/04
USPC ............... 442/404; 428/220; 536/56; 524/35
See application file for complete search history.

(56) References Cited

U.S. PATENT DOCUMENTS

| | | | |
|---|---|---|---|
| 4,681,798 A | 7/1987 | Gill et al. | |
| 5,272,954 A | 12/1993 | Crouch | |
| 5,401,588 A | 3/1995 | Garvey et al. | |
| 6,546,690 B1 | 4/2003 | Lamberts | |
| 7,252,868 B2 | 8/2007 | Suda et al. | |
| 7,344,593 B2 | 3/2008 | Luo et al. | |
| 7,410,688 B2 | 8/2008 | Baig | |
| 7,713,615 B2 | 5/2010 | Black et al. | |
| 7,829,488 B2 | 11/2010 | Bennett | |
| 8,025,769 B2 | 9/2011 | Wiker et al. | |
| 3,039,058 A1 | 10/2011 | Grove et al. | |
| 8,043,982 B2 | 10/2011 | Telander | |
| 8,186,388 B2 | 5/2012 | Princell et al. | |
| 8,409,380 B2 | 4/2013 | Black et al. | |
| 8,974,885 B2 | 3/2015 | Ohrloff et al. | |
| 9,032,679 B2 | 5/2015 | Propst | |
| 9,303,357 B2 | 4/2016 | Clark et al. | |
| 9,339,136 B2 | 5/2016 | Higgins | |
| 9,506,175 B2 | 11/2016 | Higgins | |
| 9,731,807 B2 | 8/2017 | Beumler | |
| 2004/0219845 A1 | 11/2004 | Graham et al. | |
| 2007/0148430 A1 | 6/2007 | Agrawal | |
| 2010/0320029 A1 | 12/2010 | Cao et al. | |
| 2012/0309898 A1* | 12/2012 | Hamada | C08J 5/06 525/54.23 |
| 2015/0184390 A1 | 7/2015 | Loftus et al. | |
| 2015/0225881 A1 | 8/2015 | Paradis et al. | |
| 2016/0009006 A1* | 1/2016 | Mizuta | B29C 33/405 264/293 |
| 2016/0250375 A1 | 9/2016 | Stewart | |
| 2016/0273140 A1* | 9/2016 | Wu | D21H 17/34 |
| 2017/0028678 A1 | 2/2017 | Li et al. | |
| 2017/0050411 A1 | 2/2017 | Rajabali | |
| 2017/0204304 A1* | 7/2017 | Yu | C08L 5/00 |

FOREIGN PATENT DOCUMENTS

| | | |
|---|---|---|
| WO | 1997026421 A1 | 7/1997 |
| WO | 2002099493 A1 | 12/2002 |
| WO | 2008034056 A1 | 3/2008 |
| WO | 2015057763 A1 | 4/2015 |
| WO | 2016081392 A1 | 5/2016 |
| WO | 2017127335 A1 | 7/2017 |

OTHER PUBLICATIONS

Office Action from CN Application No. 201980040170.3 dated Jul. 5, 2022.
Office Action from IN Application No. 202037051537 dated Jul. 11, 2022.
Office Action from EP Application No. 19731446.1 dated Nov. 18, 2022.
Office Action from CN Application No. 201980040170.3 dated Dec. 5, 2022.

* cited by examiner

GLASS FIBER MAT WITH LOW-DENSITY FIBERS

RELATED APPLICATIONS

This application is the U.S. national stage entry of PCT/US2019/034310, filed on May 29, 2019, which claims the benefit of U.S. Provisional Application No. 62/677,370, filed May 29, 2018, the contents of which is are incorporated by reference herein in their entireties.

FIELD

The general inventive concepts relate to binders for nonwoven mats, and also to nonwoven, fiberglass mats having a less porous structure due to the inclusion of low-density fibers.

BACKGROUND

Conventional glass fibers are useful in a variety of applications including reinforcements, textiles, and acoustical and thermal insulation materials. Nonwoven mats may be made from the fibers by conventional wet-laid processes, wherein wet chopped fibers are dispersed in a water slurry that contains surfactants, viscosity modifiers, defoaming agents, and/or other chemical agents. The slurry containing the fibers is delivered onto a moving screen where a substantial portion of the water is removed, leaving behind a web comprising the fibers and the various chemical agents in the slurry adhered to the fibers. A binder is then applied to the web, and the resulting mat is dried to remove any remaining water and cure the binder. The formed nonwoven mat is an assembly of dispersed, individual chopped fibers.

The binder composition works as an adhesive to bind the fibers together to form a cohesive product, while also improving the product's properties, such as form recovery, stiffness, acoustical openness, porosity, and structure.

The binder composition should be inexpensive, water soluble (or at least water dispersible), easily applicable, readily curable, stable to permit mixing and application at temperatures ordinarily encountered in fiber product manufacturing plants, capable of forming a strong bond between the fibers, and safe.

Various attempts have been made to improve the strength and/or to reduce the voids (i.e., open space) in nonwoven fiber mats through modifying the binder system. However, conventional methods such as inclusion of fillers often has the unwanted side effect of increasing the viscosity of the binder (often an aqueous solution that is sprayed on the fibers). Thus, there is a need for an improved binder system that is able to deliver increased strength and form a mat with a more closed structure (i.e., decreased porosity, less acoustically open), while not negatively impacting existing binder delivery methods.

SUMMARY

The general inventive concepts relate to and contemplate a nonwoven article (e.g., a mat) of inorganic fibers including at least one low-density fiber on at least a portion of a major surface of the article. The general inventive concepts also relate to and contemplate a binder for forming a nonwoven mat, the binder comprising at least one low-density fiber.

When developing a binder for use in forming a nonwoven mat of glass fibers, there are a number of considerations that must be taken into account to achieve a practical/commercial binder system. The binder provides both tensile and flexural strength to the fiber matrix and fills a portion of the voids between individual fibers. Efforts have been made in the past to improve the strength and further fill the gaps between fibers through inclusion of a filler material. However, inclusion of fillers often increases the viscosity of the binder, making application of the binder using existing manufacturing equipment and techniques difficult or impractical. An effective binder formulation must strike a balance between air permeability and strength of the final product, while also being easily dispersible on the mat during manufacture.

In an exemplary embodiment, the general inventive concepts relate to a curable composition for an article made up of nonwoven fibers. The curable composition comprises water, a binder component, and a plurality of low-density fibers, wherein the plurality of low-density fibers is present in an amount of 0.01% to 25% by weight of the curable composition.

In an exemplary embodiment, the general inventive concepts relate to a nonwoven article. The nonwoven article comprises a nonwoven web layer, wherein said nonwoven web layer comprises a plurality of inorganic fibers and a plurality of low-density fibers. The plurality of inorganic fibers are present in the nonwoven article in an amount of 50% to 90% by weight of the nonwoven article; and the plurality of low-density fibers are present in an amount of 0.01% to 10% by weight of the nonwoven article.

In an exemplary embodiment, the general inventive concepts relate to a composite panel comprising a substrate and a nonwoven mat on which the substrate is disposed. The nonwoven mat comprises a plurality of inorganic fibers and a plurality of low-density fibers, wherein the plurality of inorganic fibers are present in the nonwoven mat in an amount of 60% to 80% by weight of the nonwoven mat; and the plurality of low-density fibers are present in an amount of 1% to 5% by weight of the nonwoven mat.

In an exemplary embodiment, the general inventive concepts relate to a method of forming a nonwoven article. The method comprises mixing glass fibers having a discrete length in a dispersion substrate, depositing the glass fibers on a processing line to form a wet laid mat having a first major surface and a second major surface, applying a binder composition to at least one of the first major surface and the second major surface, and allowing the binder composition to cure to form a nonwoven article, wherein the binder composition comprises a binder component and at least one low-density fiber.

Numerous other aspects, advantages, and/or features of the general inventive concepts will become more readily apparent from the following detailed description of exemplary embodiments and from the accompanying drawings being submitted herewith.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

While the general inventive concepts are susceptible of embodiment in many different forms, there are shown in the drawings, and will be described herein in detail, specific embodiments thereof with the understanding that the present disclosure is to be considered an exemplification of the principles of the general inventive concepts. Accordingly, the general inventive concepts are not intended to be limited to the specific embodiments illustrated herein.

The materials, systems, and methods described herein are intended to be used to provide nonwoven articles with improved characteristics and curable compositions for forming the nonwoven articles. More specifically, nonwoven fiberglass mats and binders for making nonwoven fiberglass mats having uniquely closed structures coupled with improved packing density and higher Gurley performance are disclosed. The binder compositions provide these improved characteristics while maintaining processability using currently existing binder application equipment.

The terms "binder," "binder composition," and curable composition," as used herein, are used interchangeably and refer to a material that holds one or more components of a nonwoven article together. Those of ordinary skill in the art will understand that a binder composition is often an aqueous mixture or solution of dissolved ingredients that cures to interconnect fibers together.

The terms "binder solids" or "binder components," as used herein, are used interchangeably and refer to the functional ingredients of the binder composition prior to addition or mixing with water to form the ultimate binder for application to the inorganic fibers.

The terms "nonwoven," "mat," "veil," and "scrim" are used interchangeably herein and refer to a bound web of fibers.

The term "acoustic openness," as used herein, refers generally to the quality of a renovation mat to allow sound to pass through the panel. Acoustic performance of the nonwoven article may be determined by a variety of methods. Exemplary methods to measure the acoustic openness or performance of a nonwoven article include airflow resistance (rayls) and porosity (1/m$^2$/sec).

The term "low-density fiber," as used herein, refers generally to fibers which have one or more of the following characteristics: The fiber can be easily dispersed and suspended into an aqueous solution or binder mixture without sedimentation over time (e.g., over a 24-hour period). The fiber can flow easily when the fiber/binder mixture is applied on a nonwoven mat in a wet-laid process with a relatively low viscosity (e.g., a viscosity <500 cps at room temperature). In certain embodiments, the low-density may have a fiber length of less than 1 mm. Fiber lengths such as this prevent excessive fiber buildup over time, which leads to line cleanup and downtime.

Ranges as used herein are intended to include every number and subset of numbers within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

Numerous benefits result from employing the materials, systems, and methods according to general inventive concepts.

In an exemplary embodiment, the general inventive concepts relate to a curable composition for an article made up of nonwoven fibers. The curable composition comprises water, a binder component, and a plurality of low-density fibers, wherein the plurality of low-density fibers is present in an amount of 0.01% to 25% by weight of the curable composition.

In an exemplary embodiment, the general inventive concepts relate to a nonwoven article. The nonwoven article comprises a nonwoven web layer, wherein said nonwoven web layer comprises a plurality of inorganic fibers and a plurality of low-density fibers. The plurality of inorganic fibers are present in the nonwoven article in an amount of 50% to 90% by weight of the nonwoven article; and the plurality of low-density fibers are present in an amount of 0.01% to 10% by weight of the nonwoven article.

In an exemplary embodiment, the general inventive concepts relate to a composite panel comprising a substrate and a nonwoven mat on which the substrate is disposed. The nonwoven mat comprises a plurality of inorganic fibers and a plurality of low-density fibers, wherein the plurality of inorganic fibers are present in the nonwoven mat in an amount of 60% to 80% by weight of the nonwoven mat; and the plurality of low-density fibers are present in an amount of 1% to 5% by weight of the nonwoven mat.

In an exemplary embodiment, the general inventive concepts relate to a method of forming a nonwoven article. The method comprises mixing glass fibers having a discrete length in a dispersion substrate, depositing the glass fibers on a processing line to form a wet laid mat having a first major surface and a second major surface, applying a binder composition to at least one of the first major surface and the second major surface, and allowing the binder composition to cure to form the nonwoven article, wherein the binder composition comprises a binder component and at least one low-density fiber.

Nonwoven articles, including mats, according to the general inventive concepts may be formed by conventional wet-laid processes. For example, wet chopped fibers are dispersed in a water slurry that contains surfactants, viscosity modifiers, defoaming agents, and/or other chemical agents. The slurry containing the chopped fibers is then agitated so that the fibers become dispersed throughout the slurry. The slurry containing the fibers is deposited onto a moving screen where a substantial portion of the water is removed to form a web. A binder composition is then applied, and the resulting mat is dried to remove any remaining water and cure the binder. The formed nonwoven mat is an assembly of dispersed, individual chopped glass fibers interconnected by the binder.

Nonwoven articles comprised of fibers are used in a variety of applications. For example, nonwoven fiberglass mats are used as reinforcement in ceiling tiles, roofing shingles, and wall panels, among other applications. The mats are used to provide strength and other favorable properties to the ultimate product. One drawback of mats made from fiberglass is the relative acoustic openness of the mat, especially when used to form a construction board comprised of gypsum or polyisocyanurate (polyiso). While such acoustic openness is desirable in certain applications, it can be a hindrance in others. In general, when using a fiberglass mat to form a gypsum wallboard, the fiberglass mat requires additional binder materials to "close" some of the voids present in the mat (i.e., to make it less acoustically open). Due to issues such as increased viscosity, additional binder solids can only be added to a binder composition up to a certain point. Thus, fiberglass mats for use in gypsum board-construction often require a second coating (or more) of a binder composition to bring the mat to a desired level of openness. Therefore, there is a need for a material that can balance closing the voids in a fiberglass mat, while not negatively impacting the viscosity of the binder composition or the strength of the fiberglass mat, thus allowing the binder to be applied using existing binder application equipment.

The binders, according to the general inventive concepts, provide nonwoven articles having a less acoustically open structure. This is accomplished by inclusion of low-density fibers in the binder composition. Inclusion of the fibers may increase the wet tensile strength and dry tensile strength of the mats formed therewith. Other benefits of including the low-density fibers include improved surface quality, or reduced glass mat surface roughness.

The general inventive concepts also relate to a nonwoven mat that includes a plurality of substantially randomly oriented fibers enmeshed together to form a mat having a first and second major surface and a binder composition applied to at least a portion of the fibers and interconnecting the fibers. The binder itself is not particularly limited and can take the form of a number of common binders used to interconnect inorganic fibers.

The general inventive concepts are based, at least in part, on the discovery that certain low-density fibers can be added to existing binder compositions to improve the quality of certain nonwoven articles and other products made using the nonwoven articles (e.g., wall boards). The low-density fibers are capable of incorporation into existing binders without substantially affecting the currently existing technology or processes for applying the binders.

In certain exemplary embodiments, the low-density fibers are selected from microfibrillated cellulose (WC), carbon fibers, mica, micro-clay, micro-HBN (hexagonal boron nitride), micrographite, and kevlar micropulp In certain exemplary embodiments, the fibers have a length in the range of 50 microns to 1 mm, including a length of 100 microns to 500 microns. In certain exemplary embodiments, the fibers have a diameter of less than 20 microns, including diameters of 0.1 microns to 20 microns. In certain exemplary embodiments, the fibers are incorporated into the binder formulation in amounts from 0.01% by weight of the binder solids to 25% by weight of the binder solids. In certain exemplary embodiments, the fibers are incorporated into the binder formulation in amounts from 0.01% by weight of the binder solids to 2.5% by weight of the binder solids. In certain exemplary embodiments, the fibers are incorporated into the binder formulation in amounts from 0.01% by weight of the binder solids to 2% by weight of the binder solids. In certain exemplary embodiments, the fibers are incorporated into the binder formulation in amounts from 0.1% by weight of the binder solids to 2.5% by weight of the binder solids. In certain exemplary embodiments, the fibers are incorporated into the binder formulation in amounts from 0.5% by weight of the binder solids to 2.5% by weight of the binder solids. In certain exemplary embodiments, the fibers are incorporated into the binder formulation in amounts from 1% by weight of the binder solids to 2% by weight of the binder solids.

Conventional nonwoven mats are generally uniform in structure through the thickness of the mat. As mentioned previously, in certain applications, such as gypsum board construction, requires application of additional coats of binder compositions to close a portion of the voids present in a usual nonwoven mat. The general inventive concepts relate to a nonwoven article, such as a mat, that addresses the issue of acoustic openness by closing a portion of the voids in the nonwoven mat on one side of the mat more so than on the other. Thus, when viewed from a cross-sectional perspective, the nonwoven mat will have a gradient or spectrum of openness from one side to the opposite side. The gradient or layer may be formed by application of the binder to the nonwoven article.

Accordingly, in certain exemplary embodiments, the low-density fibers are dispersed within the nonwoven article in a nonuniform fashion. In certain exemplary embodiments, the general inventive concepts contemplate a nonwoven article comprised of inorganic fibers with a gradient of low-density fibers enmeshed therein. In certain exemplary embodiments, the nonwoven article includes a first major surface and a second major surface and further includes low-density fibers on only one of the two major surfaces. It is to be understood that, while the low-density fibers are described as disposed on only one of the two major surfaces, those of ordinary skill in the art will understand that the concept includes articles wherein a certain portion of the fibers will be enmeshed with the inorganic fiber network and, as such, a portion or portions of the fibers will "bleed through" the surface of the mat to entangle or enmesh with the inorganic fibers apart from the outermost "surface" of the nonwoven mat or article. In certain exemplary embodiments, the nonwoven article includes a first major surface including a first amount of low-density fibers and a second major surface having a second amount of low-density fibers, wherein the first amount of low-density fibers is greater than the second amount of low-density fibers.

While not wishing to be bound by theory, it is believed that certain low-density fibers are capable of chemical bonding (either covalent, ionic, or otherwise) with functional groups in the binder components or those on the inorganic fibers (e.g., hydroxyl groups on glass surface). This chemical bonding, when present, may increase the dry tensile strength, wet tensile strength, packing density, Gurley performance, or other performance characteristic of the nonwoven article by effectively acting as a secondary binder material.

As mentioned previously, the general inventive concepts relate to a binder comprising the low-density fibers. In certain exemplary embodiments, the binder is selected from: acrylic binders, urea-formaldehyde binders (UF), polyvinyl alcohol, polyvinylacetate, and carbohydrate-based binders, among others. In certain exemplary embodiments, the binder is a carbohydrate-based binder system. In certain exemplary embodiments, a binder is present in the nonwoven article in an amount of 10% to 30% by weight.

In certain exemplary embodiments, more than one binder system is used to bind the fibers together. In certain exemplary embodiments, a two-part binder system is used. In certain exemplary embodiments, each of a first binder and a second binder are independently selected from: acrylic binders, urea-formaldehyde binders (UF), polyvinyl alcohol, polyvinylacetate, and carbohydrate-based binders, among others. In certain exemplary embodiments, the binder system includes a two-part binder that includes (1) a carbohydrate-based binder and (2) a f hydrophobic acrylic-based binder. In certain embodiments, both binders are formaldehyde free.

With regard to the first part of the two-part binder, the formaldehyde-free carbohydrate-based binder is a thermoset binder that comprises, among other things, a carbohydrate and a crosslinking agent (such a binder is described in greater detail below). Following the application and cure of the first-part of the binder system (the formaldehyde-free carbohydrate-based binder) on the non-woven glass mat, the second-part of the binder, a formaldehyde-free hydrophobic acrylic-based binder, is applied to the glass mat and cured. The acrylic-based binder is a thermoset binder containing acrylic and/or acrylonitrile functionality. This acrylic-based binder is applied as an aqueous emulsion or latex.

In certain exemplary embodiments, the binder composition includes at least one carbohydrate or bio-based curable polymer, a cross-linking agent, and a corrosion inhibitor. In some exemplary embodiments, the curable polymer is a carbohydrate polymer, such as maltodextrin, the cross-linking agent is polyacrylic acid, and the corrosion inhibitor is triethanolamine.

In certain exemplary embodiments, the binder composition also includes one or more of a coupling agent, a biocide, a crosslinking density enhancer, a moisture resistant agent, a dust suppressing agent, an extender, or combinations thereof.

In certain exemplary embodiments, the binder includes at least one carbohydrate polymer that is of natural origin and derived from renewable resources. For instance, the carbohydrate may be derived from plant sources, such as legumes, maize, corn, waxy corn, sugar cane, milo, white milo, potatoes, sweet potatoes, tapioca, rice, waxy rice, peas, sago, wheat, oat, barley, rye, amaranth, and/or cassava, as well as other plants that have a high starch content. The carbohydrate polymer may also be derived from crude starch-containing products derived from plants that contain residues of proteins, polypeptides, lipids, and low molecular weight carbohydrates. The carbohydrate polymer may be selected from disaccharides (e.g., sucrose, maltose, and lactose), oligosaccharides (e.g., glucose syrup and fructose syrup), and polysaccharides and water-soluble polysaccharides (e.g., pectin, dextrin, maltodextrin, starch, modified starch, and starch derivatives). In addition, the carbohydrate may be selected from monosaccharides, which may be polymerized (e.g., xylose, glucose, and fructose).

In certain exemplary embodiments, the carbohydrate polymer may have a number average molecular weight from about 1,000 to about 1,000,000. In some exemplary embodiments, the carbohydrate polymer is a low molecular weight polysaccharide, such as dextrin or maltodextrin, having a molecular weight in the range of 500-500,000. Additionally, the carbohydrate polymer may have a dextrose equivalent (DE) number from 2 to 20, from 7 to 11, or from 9 to 14. In some embodiments, the carbohydrate polymer has a DE of 10. The carbohydrate polymers beneficially have a low viscosity and cure at moderate temperatures (e.g., 80-250° C.) alone or with additives.

In certain exemplary embodiments, the carbohydrate polymer may be present in the binder composition in an amount from about 1% to about 70%, from about 20% to about 60%, from about 30% to about 50%, or from about 35% to about 45% by weight of the total solids in the binder composition. In some exemplary embodiments, the carbohydrate polymer is present in about 39% to about 42% by weight of the total solids in the binder composition.

In certain exemplary embodiments, the binder composition contains at least one polycarboxy polymer. The polycarboxy polymer comprises an organic polymer or oligomer containing more than one pendant carboxy group. The polycarboxy polymer may be a homopolymer or copolymer prepared from unsaturated carboxylic acids including, but not limited to, acrylic acid, methacrylic acid, crotonic acid, isocrotonic acid, maleic acid, cinnamic acid, 2-methylmaleic acid, itaconic acid, 2-methylitaconic acid, alpha, beta-methyleneglutaric acid, and the like. Alternatively, the polycarboxy polymer may be prepared from unsaturated anhydrides including, but not necessarily limited to, maleic anhydride, itaconic anhydride, acrylic anhydride, methacrylic anhydride, and the like, as well as mixtures thereof. The polymerization of these acids and anhydrides is considered to be within the abilities of one of ordinary skill in the art.

The polycarboxy polymer may additionally comprise a copolymer of one or more of the aforementioned unsaturated carboxylic acids or anhydrides and one or more vinyl compounds including, but not necessarily limited to, styrene, alpha-methyl styrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, vinyl acetate, and the like. In certain exemplary embodiments, the polycarboxy polymer comprises homopolymers and copolymers of polyacrylic acid.

In certain exemplary embodiments, the polycarboxy polymer is present in the binder composition in an amount up to about 80% by weight of the binder composition. In exemplary embodiments, the polycarboxy polymer may be present in the binder composition in an amount from about 25% to about 70% by weight of the total solids in the binder composition or from about 35% to about 60% by weight of the total solids in the binder composition. In some exemplary embodiments, the polycarboxy polymer is present in an amount from 52% to 56% by weight of the total solids in the binder composition.

In certain exemplary embodiments, the binder composition further includes a corrosion inhibitor to reduce or eliminate any potential corrosion to the process equipment. The corrosion inhibitor can be chosen from a variety of agents, such as, for example, triethanolamine, hexamine, benzotriazole, phenylenediamine, dimethylethanolamine, polyaniline, sodium nitrite, benzotriazole, dimethylethanolamine, polyaniline, sodium nitrite, cinnamaldehyde, condensation products of aldehydes and amines (imines), chromates, nitrites, phosphates, hydrazine, ascorbic acid, tin oxalate, tin chloride, tin sulfate, thiourea, zinc oxide, nitrile, and combinations thereof. In some embodiments, the corrosion inhibitor is triethanolamine. The corrosion inhibitor may be present in the binder composition in an amount from about 0% to about 15% by weight, from about 1% to about 10% by weight, from about 2% to about 7% by weight, or about 5% by weight of the total solids in the binder composition.

In certain exemplary embodiments, the binder composition may optionally contain at least one coupling agent. In certain exemplary embodiments, the coupling agent is a silane coupling agent. The coupling agent may be present in the binder composition in an amount from about 0.01% to about 5% by weight, from about 0.01% to about 2.5% by weight, from about 0.1% to about 0.5% by weight, or about 0.2% by weight of the total solids in the binder composition.

Non-limiting examples of silane coupling agents that may be used in the binder composition may be characterized by the functional groups alkyl, aryl, amino, epoxy, vinyl, methacryloxy, ureido, isocyanato, and mercapto. In exemplary embodiments, the silane coupling agent includes silanes containing one or more nitrogen atoms that have one or more functional groups such as amine (primary, secondary, tertiary, and quaternary), amino, imino, amido, imido, ureido, or isocyanato. Specific, non-limiting examples of suitable silane coupling agents include, but are not limited to, aminosilanes (e.g., 3-aminopropyl-triethoxysilane and 3-aminopropyl-trihydroxysilane), epoxy trialkoxysilanes (e.g., 3-glycidoxypropyltrimethoxysilane and 3-glycidoxypropyltriethoxysilane), methyacryl trialkoxysilanes (e.g., 3-methacryloxypropyltrimethoxysilane and 3-methacryloxypropyltriethoxysilane), hydrocarbon trialkoxysilanes, amino trihydroxysilanes, epoxy trihydroxysilanes, methacryl trihydroxy silanes, and/or hydrocarbon trihydroxysilanes.

In certain exemplary embodiments, the binder composition may optionally include at least one crosslinking density enhancer to improve the degree of crosslinking of the carbohydrate based polyester binder. Crosslinking density enhancement can be achieved by increasing esterification between the hydroxyl and carboxylic acid groups and/or introducing free radical linkages to improve the strength of the thermoset resin. The esterification crosslinking density can be adjusted by changing the ratio between hydroxyl and carboxylic acid and/or by adding additional esterification functional groups such as triethanolamine, diethanolamine, mono ethanolamine, 1-amino-2-propanol, 1,1'-aminobis-2-propanol, 1,1',1"nitrilotri-2-propanol, 2-methylaminoethanol, 2-dimethylaminoethanol, 2-(2-aminoethoxy)ethanol, 2{(2aminoethyl)amino}ethanol, 2-diethylaminoethanol, 2-butylaminoethanol, 2-dibutylaminoethanol, 2cyclohexylamincethanol, 2,2'-(methylamino)bis-ethanol, 2,2'-(butylamino)bis-ethanol, 1-methyl amino-2propanol, 1-dimethylamino-2-propanol, 1-(2-aminoethylamino)-2-propanol, 1,1'-(methylimino)bis-2-propanol, 3-amino-1-propanol, 3-dimethylamino-1propanol, 2-amino-1-butanol, 1-ethylamino-2-butanol, 4-diethylamino-1-butanol, 1-diethylamino-2-butanol, 3-amino-2,2-dimethyl-1-propanol, 2,2-dimethyl-3-dimethylamino-1-propanol, 4-diethylamino-2-butyn-1-ol, 5-diethylamino-3-pentyne-2-ol, bis(2-hydroxypropyl)amine, as well as other alkanolamines, their mixtures, and their polymers. Another method to achieve crosslinking density enhancement is to use both esterification and free radical reaction for the crosslinking reactions. Chemicals that can be used for both reactions include maleic anhydride, maleic acid, or itaconic acid. The crosslinking density enhancer may be present in the binder composition in an amount from about 0% to about 25% by weight of the total solids in the binder composition.

In certain exemplary embodiments, the binder composition may also contain a moisture resistant agent, such as alum, aluminum sulfate, latex, a silicon emulsion, a hydrophobic polymer emulsion (e.g., polyethylene emulsion or polyester emulsion), and mixtures thereof. In at least one exemplary embodiment, the latex system is an aqueous latex emulsion. The latex emulsion includes latex particles that are typically produced by emulsion polymerization. In addition to the latex particles, the latex emulsion may include water, a stabilizer such as ammonia, and a surfactant. The moisture resistant agent may be present in the binder composition in an amount from 0% to about 20% by weight, from about 5% to about 10% by weight, or from about 5% to about 7% by weight of the total solids in the binder composition.

The binder composition may optionally contain conventional additives such as, but not limited to dyes, pigments, fillers, colorants, UV stabilizers, thermal stabilizers, antifoaming agents, anti-oxidants, emulsifiers, preservatives (e.g., sodium benzoate), corrosion inhibitors, and mixtures thereof. Other additives may be added to the binder composition for the improvement of process and product performance. Such additives include lubricants, wetting agents, surfactants, antistatic agents, and/or water repellent agents. Additives may be present in the binder composition from trace amounts (such as <about 0.1% by weight the binder composition) up to about 10% by weight of the total solids in the binder composition. In certain exemplary embodiments, the additives are present in an amount from 0.1% to 5% by weight of the total solids in the binder composition.

The binder further includes water to dissolve or disperse the active solids for application onto the reinforcement fibers. Water may be added in an amount sufficient to dilute the aqueous binder composition to a viscosity that is suitable for its application to the reinforcement fibers and to achieve a desired solids content on the fibers. In particular, the binder composition may contain water in an amount from about 50% to about 98% by weight of the total binder composition.

As previously discussed, the general inventive concepts relate to a method of forming a nownoven mat. The binder according to the general inventive concepts is generally added during the formation of the nonwoven article in a wet-laid mat processing line. Chopped glass fibers may be provided to a conveying apparatus such as a conveyor by a storage container for delivery to a mixing tank that contains various surfactants, viscosity modifiers, defoaming agents, and/or other chemical agents with agitation to disperse the fibers and form a glass fiber slurry. The glass fiber slurry may be deposited onto a conveying apparatus such as a moving screen or foraminous conveyor, and a substantial portion of the water from the slurry is removed to form a wet laid mat of enmeshed fibers. The water may be removed from the web by a conventional vacuum or air suction system. The binder is applied to the mat by a suitable binder applicator, such as a spray applicator or a curtain coater. The binder application allows for good dispersion of fiber (or filler particle) with good resin coalescence to wet and fill the fiber interstices before allowing the binder composition to cure. Once the binder has been applied to the mat, the binder coated mat may be passed through at least one drying oven to remove any remaining water and cure the binder composition. The resulting nonwoven mat that emerges from the oven is an assembly of substantially randomly oriented, dispersed, individual glass fibers interconnected by a binder.

In an exemplary embodiment, the general inventive concepts relate to a method of forming a nonwoven article. The method comprises mixing glass fibers having a discrete length in a dispersion substrate (e.g., water slurry), depositing the glass fibers on a processing line to form a wet laid mat having a first major surface and a second major surface, applying a binder composition to at least one of the first major surface and the second major surface, allowing the binder composition to cure to form a nonwoven mat, wherein the binder composition comprises a binder component and at least one low-density fiber.

In addition to the nonwoven mats discussed thus far, it is also desirable to add one or more additional materials or layers of material to a nonwoven mat. Such additional material may be applied to a nonwoven mat after initial binder curing. In an exemplary embodiment, an additional material is applied to a cured nonwoven mat by means of spraying or coating the additional material (as a component of a slurry) onto one or more of the first major surface and the second major surface of the nonwoven mat. In certain embodiments, the additional material is applied in one pass. In certain embodiments, the additional material is applied in more than one pass. In embodiments where more than one pass is used to apply the additional materials, the binder may be allowed to cure between passes under a coating mechanism or the binder may be cured after a final pass. In certain embodiments the binder may be cured rapidly by means of one or more IR lasers. In certain embodiments, it is desirable to apply the additional material in such a manner that the additional material does not penetrate the nonwoven article to a substantial degree and remains as a partial or complete layer on only one major surface of the nonwoven article.

As mentioned, in certain exemplary embodiments, an additional material is applied to a nonwoven mat according to the general inventive concepts. Similar to the application of the binder above, the additional material may be applied to the mat by a suitable binder applicator, such as a spray applicator or a curtain coater This application system can apply various glass fibers, carbon fibers, cellulose fibers, graphene fibers, micro fibers, graphite, etc. to a mat as it is running on a production mat line. Applying various fibers, materials and resins to produce a "sandwich" type composite mat will generate mats with physical property improvements much better than the original single or bi-component mat. Application of the additional material after binder application may solve the off-line multiple layer system process approach to making a multilayered product, through in-line coating/mat process. Through this process, multi-functional nonwoven mats or composites can be produced. This system/method will allow the layering of mats of different compositions with different functionalities.

The additional material may be applied in wet or aqueous mixture/slurry comprising a carrier (e.g., water) and optionally, a binder. Suitable binders for use according to the general inventive concepts include those for use with fiberglass mats and include the binders and binder compositions described herein. Those of ordinary skill will understand that the characteristics of the particular additional material will may render certain binders more suitable than others, for adhering the additional material to the nonwoven article/mat.

In certain exemplary embodiments, the additional material is applied to the nonwoven mat to enhance or alter one or more physical properties of the mat. Such properties include, but are not limited to electrical conductivity/resistance, flexibility, durability, weathering, moisture repellency, corrosion resistance, rigidity, porosity, aesthetics, fire or smoke resistance, puncture resistance, tensile strength, and tear strength, among others.

The general inventive concepts also contemplate the nonwoven mats discussed herein as a part of a construction board comprising a substrate such as gypsum or foam (polyiso). The nonwoven mats discussed herein are particularly suited to formation of boards made from gypsum and or foam due to the low void space present in the mats after application of the low density fibers. Generally, gypsum boards contain a core formed of a gypsum material that are reinforced by at least one facing layer (often two layers, with one on each major surface of the board). Known methods for making gypsum boards consists of providing a continuous feed of facing material and depositing a gypsum slurry onto a surface of the facing material. A second continuous feed of facing material is then applied to the top surface of the slurry. The slurry is dried to harden the gypsum composition and to integrate the facing material into the board. The gypsum board is subsequently cut to a predetermined length for shipping and eventual use.

In certain exemplary embodiments, the nonwoven mat may further include one or more coatings. The coating may be applied to only a single-side or impregnated. In certain exemplary embodiments, the coating may have the following composition: about 90% calcium carbonate, about 10% binder, plus optional additives. In certain exemplary embodiments, the binder for this coating is selected from a vinyl versatate, a styrene acrylic, ethylene vinyl acetate, or a PVA with a formaldehyde-based cross-linker, or combinations thereof. In certain exemplary embodiments, the coating is present in an amount of 10 gsm-300 gsm (dry), including 100 gsm-300 gsm (dry).

Facing materials advantageously contribute flexural, nail pull resistance, and impact strength to the high compressive strength but elongationally brittle material forming the cementitious core. In addition, the facing material can provide a durable surface and/or other desirable properties to the gypsum board. Exemplary methods of producing construction boards can be found in U.S. Pat. No. 8,039,058, the content of which is incorporated herein by reference.

While particular embodiments are described herein, one of ordinary skill in the art will recognize that various other combinations of elements are possible and will fall within the general inventive concepts. Likewise, one of ordinary skill in the art will understand that the various embodiments of nonwoven mats described herein are suitable for use in the methods described herein.

EXAMPLES

As previously mentioned, when developing a mat for use in making a gypsum wall board, acoustic openness is an integral characteristic that must be adjusted to deliver an acceptable product. The following examples describe various glass fiber mats made using binder compositions according to the general inventive concepts.

Figure 1:
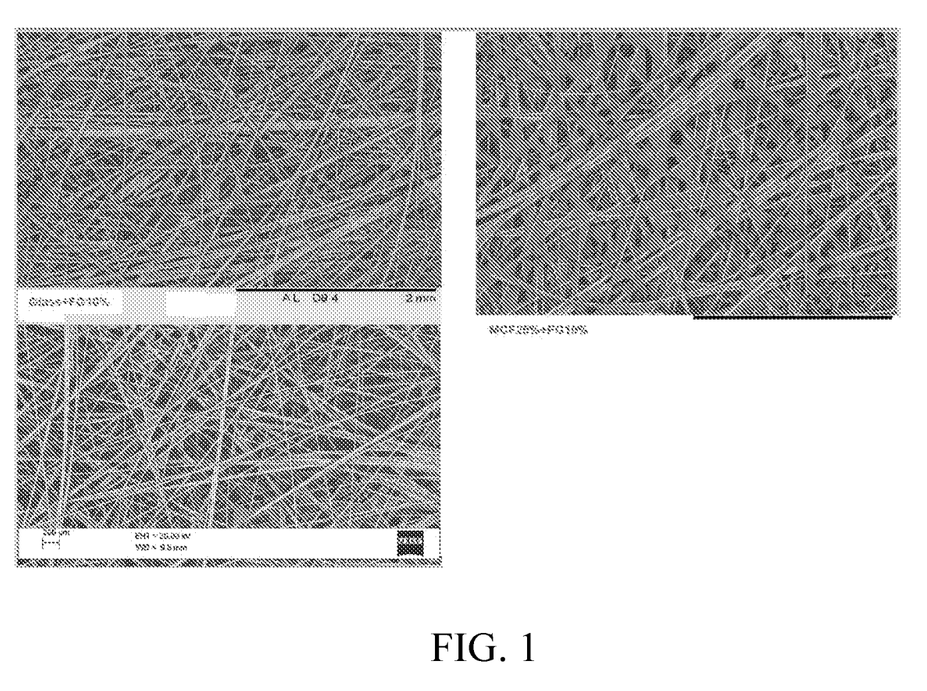
FIG. 1 shows three scanning electron microscope (SEM) images of glass fiber samples made using a variety of binders.
Figure 2:
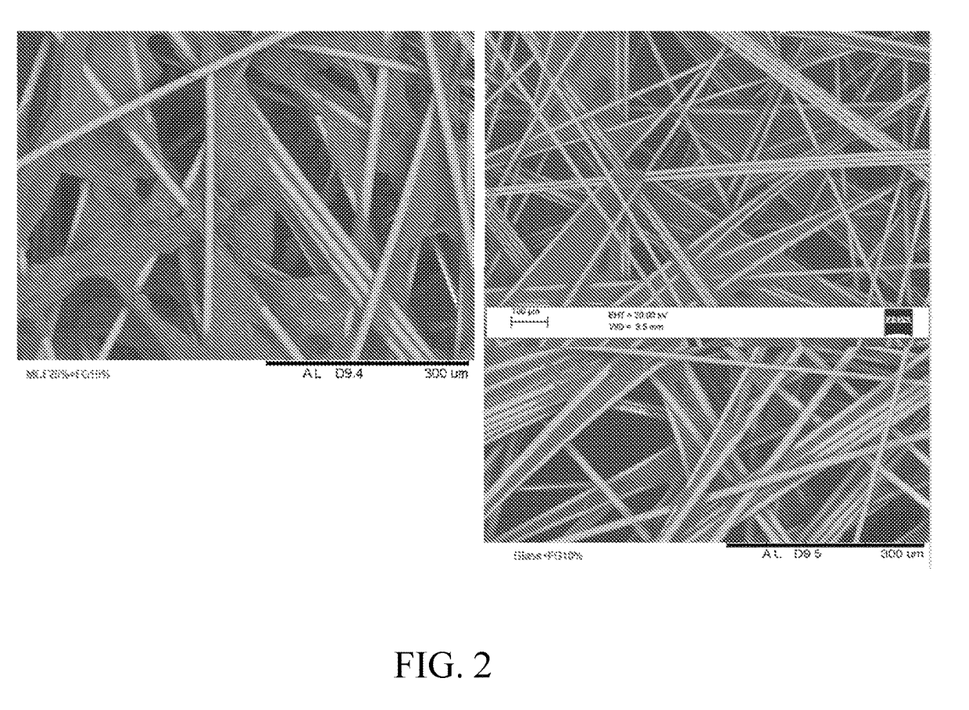
FIG. 2 shows high magnification images of the samples shown in FIG. 1.

FIG. 1 shows three scanning electron microscope (SEM) images of glass fiber samples made using a conventional binder. The mats include 1) binder alone, 2) a conventional binder plus 10% fine graphite by weight of the binder content, and a conventional binder including 10% fine graphite and 25% microfibrillated cellulose (MCF). As can be seen from the images, the mat including the fine graphite and the microfibrillated cellulose has a less open structure. FIG. 2 shows high magnification images of the samples shown in FIG. 1. The images show that the MCF entangled with the glass fibers to build a network with extended fiber webbing, thereby reducing air permeation.

Figure 3:
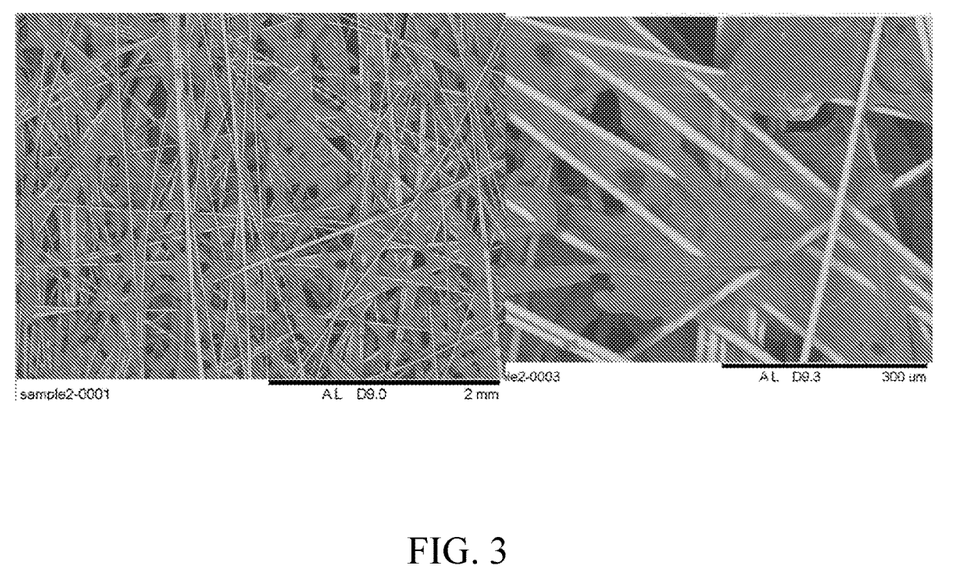
FIG. 3 shows SEM images of a sample produced using a conventional binder with 10% coarse graphite in combination with 25% MCF.

FIG. 3 shows SEM images of a sample produced using a conventional binder with 10% coarse graphite in combination with 25% MCF. The images show that the coarser graphite is able to further close the pores/voids in the mat.

Figure 4:
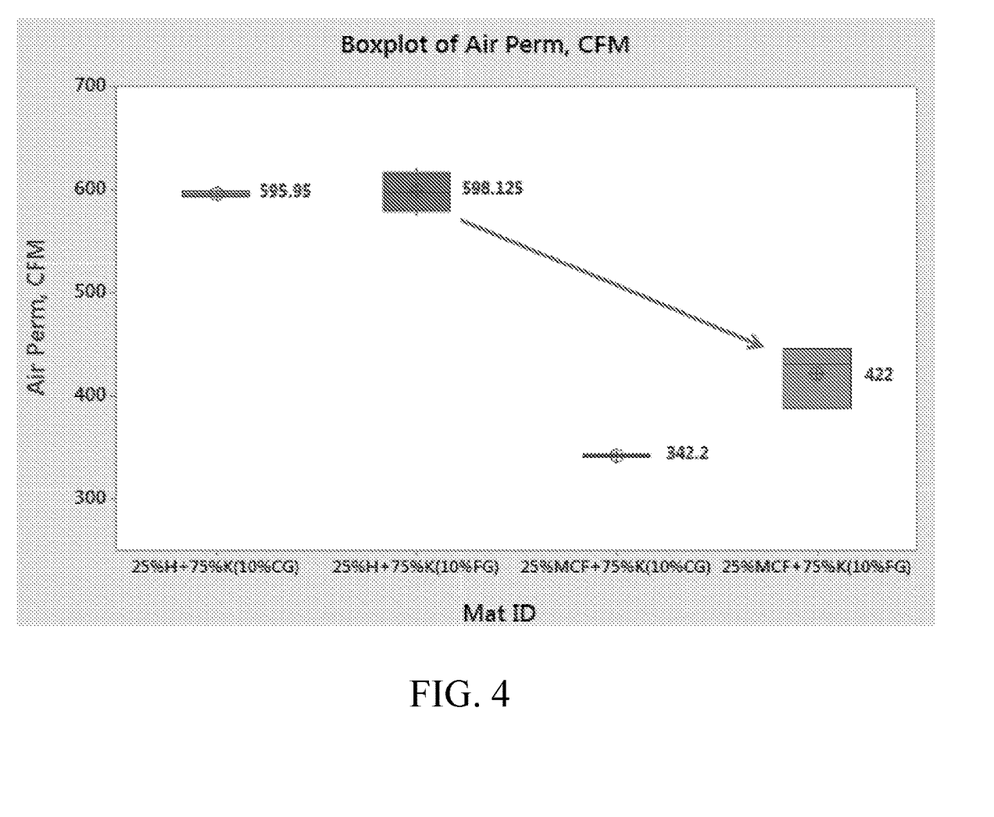
FIG. 4 is a graph showing the air permeability of a series of nonwoven mats.
Figure 5A:
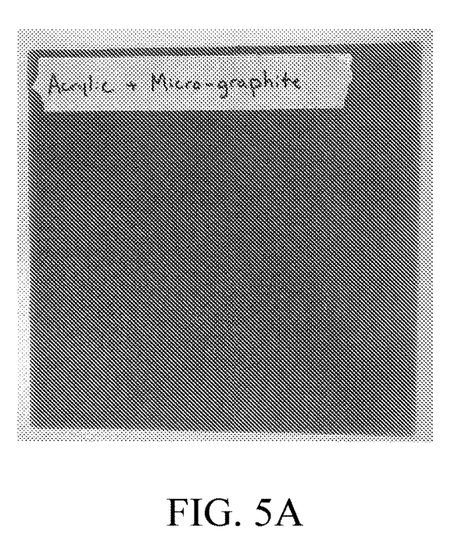
FIG. 5A shows a first major surface of a nonwoven mat made with an acrylic binder having micro-graphite applied thereto.
Figure 5B:
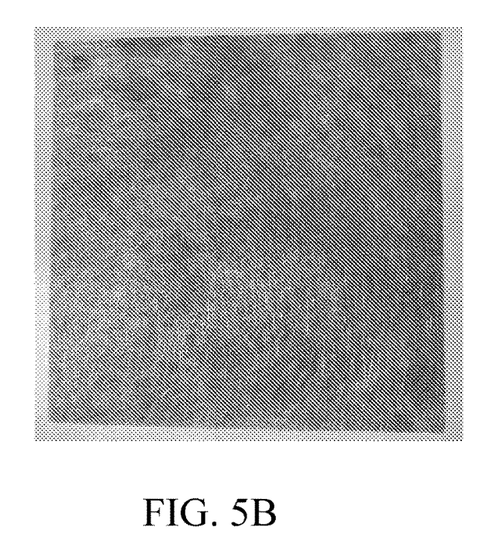
FIG. 5B shows a second major surface of the nonwoven mat shown in FIG. 5A.
Figure 6A:
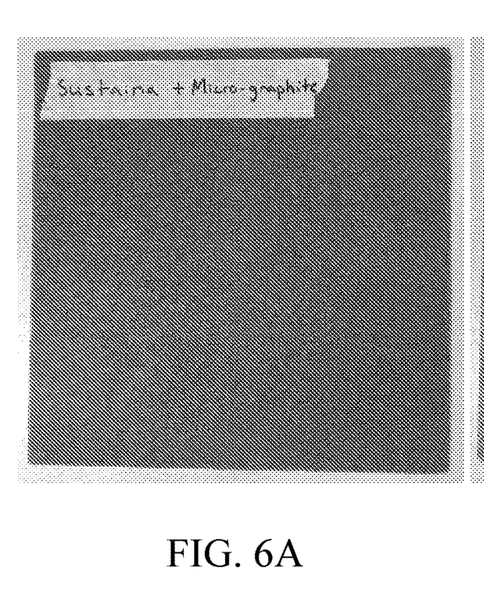
FIG. 6A shows a first major surface of a nonwoven mat made with a formaldehyde-free binder (sold by Owens Corning Inc. as SUSTAINA) having micro-graphite applied thereto.
Figure 6B:
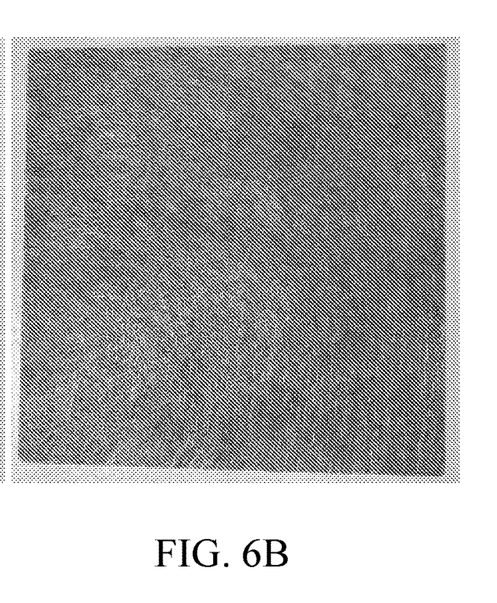
FIG. 6B shows a second major surface of the nonwoven mat shown in FIG. 6A.
Figure 7A:
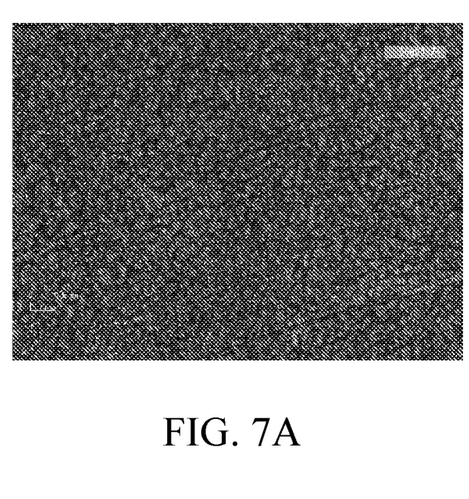
FIG. 7A shows an optical microscope closeup image of the first major surface shown in FIG. 6A.
Figure 7B:
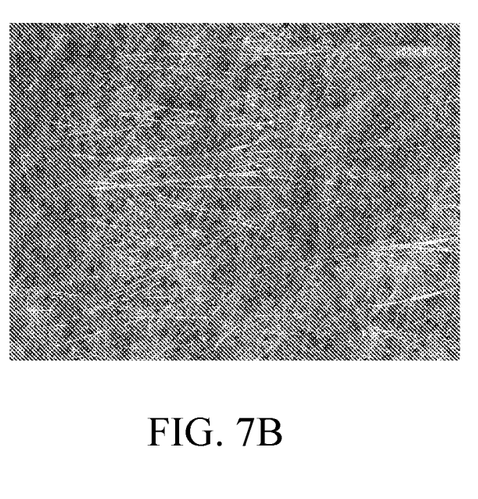
FIG. 7B shows an optical microscope closeup image of the second major surface shown in nonwoven mat of FIG. 6B.

FIG. 4 is a graph showing the air permeability of a series of nonwoven mats. Mats made using a conventional binder system with 10% fine graphite and 25% MCF showed a >25% reduction in air permeability when compared to a similar system using H fibers (fibers having an average diameter of 11 microns) in place of the MCF fibers.

In addition to the two-layer design discussed above, additional layers (or layer(s) of additional material) may be desired depending on the application of the additional material. For example, automotive batteries use glass mats as a carrier between the positive and negative plates. In such cases, a conductive coating is necessary on one side of the mat while allowing the other side to remain resistive.

A coating of micro-graphite was applied above the existing mat using a conventional spray system (here, it was a system used to cool fibers during the forming process). 3% PVP and 1.5% graphite in water were mixed and used as the coating. This mixture was pumped into one end of the sprayer while air was pumped into the other end. The air pressure was adjusted to 50 psi and the graphite mixture was adjusted to 15 psi. These settings were determined to best atomize the mixture to create an optimal single layer coating. The mat was then cured at 451° F. for one minute. FIGS. 5A-B and 6A-B show the final product on both Acrylic and Sustaina mats. The optical images 7A-B show close-ups of the front and back surfaces of one of these mats on a Sustaina hinder. As can be seen from the figures, a continuous graphite network has been deposited on the front surface of the mat, indicating a fully conductive layer. The back surface shows glass fibers generally unmarked by the graphite, signifying a single layer of coverage that does not penetrate the nonwoven mat. To coat the mat with the micro-graphite mixture, it was necessary to pass the mat under the applicator multiple times.

As disclosed and suggested herein, the general inventive concepts relate to and contemplate an improved binder and nonwoven articles made using the binder. Furthermore, the scope of the general inventive concepts are not intended to be limited to the particular exemplary embodiments shown and described herein. From the disclosure given, those skilled in the art will not only understand the general inventive concepts and their attendant advantages, but will also find apparent various changes and modifications to the methods and systems disclosed. It is sought, therefore, to cover all such changes and modifications as fall within the spirit and scope of the general inventive concepts, as described and suggested herein, and any equivalents thereof.

What is claimed is:

1. A curable composition for an article made of nonwoven fibers, the curable composition comprising:
    water;
    a binder component; and
    a plurality of low-density fibers;
    wherein the plurality of low-density fibers have an average length of 50 microns to 1 mm and an average diameter of 0.5 to 20 micron,
    wherein the plurality of low-density fibers are present in an amount of 0.01% to 25% by weight of the curable composition
    wherein the binder component is selected from the group consisting of acrylic binders, urea-formaldehyde binders (UF), polyvinyl alcohol, polyvinylacetate, carbohydrate-based binders, and combinations thereof.

2. The curable composition of claim 1, wherein the plurality of low-density fibers are selected from the group consisting of microfibrillated cellulose (MFC), carbon fibers, mica, micro-clay, micro-HBN, kevlar micropulp, and combinations thereof.

3. The curable composition of claim 1, wherein the plurality of low-density fibers have an average length of 200 microns to 1 mm.

4. The curable composition of claim 1, wherein the plurality of low-density fibers have an average diameter of 0.5 to 1 micron.

5. The curable composition of claim 1, wherein the plurality of low-density fibers are present in an amount of 5% to 25% by weight of the curable composition.

6. A nonwoven article comprising:
    a nonwoven web layer having a first major surface and a second major surface defining a thickness therebetween, wherein said nonwoven web layer comprises:
        a plurality of inorganic fibers present in an amount of 50% to 90% by weight of the nonwoven article, and
        a plurality of low-density fibers present in an amount of 0.01% to 10% by weight of the nonwoven article,
    wherein the low-density fibers are present in the nonwoven web layer as a gradient that decreases from the first major surface through at least a portion of the thickness of the nonwoven web layer.

7. The nonwoven article of claim 6, wherein the inorganic fibers are glass fibers.

8. The nonwoven article of claim 6, wherein the plurality of low-density fibers are selected from the group consisting of microfibrillated cellulose (MFC), carbon fibers, mica, micro-clay, micro-HBN, kevlar micropulp, and combinations thereof.

9. The nonwoven article of claim 6, wherein the plurality of low-density fibers have an average length of 50 microns to 1 mm.

10. The nonwoven article of claim 6, wherein the plurality of low-density fibers have an average diameter of less than 1 micron.

11. A method of forming the nonwoven article of claim 6, the method comprising:
    mixing glass fibers having a discrete length in a dispersion substrate;
    depositing the glass fibers on a processing line to form a wet laid mat having a first major surface and a second major surface;
    applying a binder composition to at least one of the first major surface and the second major surface; and
    allowing the binder composition to cure to form a nonwoven mat,
    wherein the binder composition comprises a binder component and at least one low-density fiber.

12. The method of claim 11, wherein the binder component is selected from the group consisting of acrylic binders, urea-formaldehyde binders (UF), polyvinyl alcohol, polyvinylacetate, carbohydrate-based binders, and combinations thereof.

13. The method of claim 11, further comprising application of at least one additional material to a major surface of the nonwoven article, wherein the at least one additional material enhances a property selected from: electrical conductivity/resistance, flexibility, durability, weathering, moisture repellency, corrosion resistance, rigidity, porosity, aesthetics, fire or smoke resistance, puncture resistance, tensile strength, tear strength, and combinations thereof.

14. A composite panel comprising:
a substrate; and
a nonwoven article having a first major surface and a second major surface defining a thickness therebetween, wherein said nonwoven article comprises:
   a plurality of inorganic fibers present in an amount of 60% to 80% by weight of the nonwoven article, and
   a plurality of low-density fibers present in an amount of 0.01% to 5% by weight of the nonwoven article,
wherein the low-density fibers are present in the nonwoven article as a gradient that decreases from the first major surface through at least a portion of the thickness of the nonwoven article.

15. The composite panel of claim 14, wherein the plurality inorganic fibers are glass fibers.

16. The composite panel of claim 14, wherein the plurality of low-density fibers is selected from the group consisting of microfibrillated cellulose (MFC), carbon fibers, mica, micro-clay, micro-HBN, kevlar micropulp, and combinations thereof.

17. The composite panel of claim 14, wherein the plurality of low-density fibers have an average length of 50 microns to 1 mm.

18. The composite panel of claim 14, wherein the plurality of low-density fibers have an average diameter of less than 1 micron.

19. The composite panel of claim 14, wherein the substrate is selected from gypsum, a foam, or combinations thereof.

\* \* \* \* \*